United States Patent Office 3,424,519
Patented Jan. 28, 1969

3,424,519
VISUAL PARAMETER TESTER
William J. White, Santa Monica, Calif., assignor, by mesne assignments, to McDonnell Douglas Corporation, Santa Monica, Calif., a corporation of Maryland
Filed Feb. 15, 1967, Ser. No. 616,289
U.S. Cl. 351—17      10 Claims
Int. Cl. A61b 3/02

ABSTRACT OF THE DISCLOSURE

Visual parameter testing apparatus including a light source and optical elements arranged to produce primary and secondary light beams which are selectively controlled to form an appropriate image of variable characteristics on a screen for observation by subject. Flicker shutter and light attenuator are selectively operated in the beam paths to produce variation of image characteristics. Subject's test response causes recording of encoder output which is related to instantaneous condition of characteristic, and also causes reversal of variation thereof after a random time delay controlled by random time delay circuit.

Background of the invention

This invention relates generally to the field of visual testing apparatus and more particularly to means for testing visual parameters such as differential brightness sensitivity, absolute brightness sensitivity and critical fusion frequency, among others, of a subject.

In the testing and measuring of the various parameters of human vision, a multiplicity of elaborate and bulky equipment have been required to produce the proper test stimuli (images), to cause such stimuli to vary in a desired manner, and to measure and record the test data and results.

The test data and results, in the past, have been additionally inaccurate and unreliable in that the subject learns during the course of a test to anticipate the moment when a critical or response point is reached. Thus, while the subject is performing a test, he quickly develops a response pattern which may invalidate the accuracy and correctness of the test data and results.

Summary of the invention

Briefly, and in general terms, the present invention accomplishes visual parameter testing of a subject by employing apparatus including a light source and optical elements arranged in a container to produce primary and secondary light beams therein which are used jointly or independently, as selected, to provide a suitable test image on a viewing screen on the container.

The primary beam is normally used to illuminate the entire viewing screen and the secondary beam is normally used to illuminate a central portion of the screen. A flicker or primary shutter is provided in the path of the primary beam and is normally used to produce 100 percent square wave modulation of the primary beam. The flicker shutter is driven by a flicker motor and can also be selectively set to fixed positions so as to block the primary beam or to permit passage of the same without disrupting it.

A variable light attenuator and a secondary shutter are positioned in the path of the secondary beam. This shutter is normally positioned so as to not disturb the secondary beam. However, the shutter can be selectively actuated to block the secondary beam. The attenuator is mounted on a rotatable main shaft and varies the brightness of the central light portion produced on the screen by the secondary beam with rotation of the main shaft.

A shaft angle encoder is suitably coupled to the main shaft and provides an output signal which is representative of the instantaneous angular position of the shaft. The angular position of the main shaft is, of course, related to the position of the light attenuator and, hence, the output of the encoder is representative of the instantaneous brightness of the central light portion produced on the screen by the unblocked secondary beam.

A main drive motor is connected to drive the main shaft and the wiper of a potentiometer continuously between maximum angular limits. The potentiometer indirectly controls the speed of the flicker motor. Thus, the secondary beam is continuously varied in attenuation and the primary beam is continuously varied in frequency of square wave modulation when the attenuator and flicker shutter are operatively driven in the paths of the unblocked secondary and primary beams. However, when the flicker shutter is driven in a test, the secondary beam is normally blocked.

In measuring differential brightness sensitivity of the subject, both primary and secondary beams are utilized, and an override signal is applied to set the flicker shutter at a position which does not disturb the primary beam. The primary beam produces background illumination of the entire viewing screen at a selected brightness. The secondary beam produces central spot illumination of the screen and the brightness of the central spot is varied between maximum limits with the rotation of the main shaft and attenuator. The secondary shutter is, of course, not actuated.

The subject is required to press a push-button switch on detection of the appearance or disappearance of the central luminous spot as it changes in brightness relative to the background illumination of the screen. When the push-button switch is actuated, the instantaneous output of the encoder is recorded and an input signal is provided to a random time delay circuit. After a random time delay, the delay circuit causes a reversal of the main drive motor and the attenuator. This test is repeated a number of times with a random time delay produced after each actuation of the push-button switch. The subsequent reversal of the attenuator after a random time delay prevents the subject from learning to anticipate when a matching condition will be reached.

In measuring absolute brightness sensitivity, the flicker shutter is set to the position which occults or blocks the primary beam. The secondary shutter is left unactuated so that the viewing screen will be illuminated only by the secondary beam. The attenuator can be driven between maximum limits by the rotatable main shaft and its main drive motor such that the illumination of the central luminous spot on the viewing screen will be correspondingly varied.

The subject responds in this test by pressing the push-button switch when the spot appears and disappears. Actuation of the push-button switch causes the instantaneous output of the encoder to be recorded and an input signal provided to the random time delay circuit as before. After a random time delay, the main drive motor and the attenuator is reversed in direction and the test is repeated.

In measuring critical fussion frequency sensitivity of the subject, the secondary shutter is actuated to occult or block the secondary beam. The primary beam is interrupted by the rotating flicker shutter which is driven by the flicker motor that is controlled in speed by the potentiometer having its wiper driven by the main drive motor. The viewing screen is thus illuminated by the primary beam which is modulated at a varying, square wave frequency.

The subject responds in this test by pressing the push-button switch when flicker becomes apparent with decreasing frequency and when it disappears with increasing frequency. As before, actuation of the push-button switch causes the instantaneous output of the encoder to be recorded and an input signal provided to the random time delay circuit. The encoder reading is representative of main shaft angular position which, in turn, is related specifically to the position of the wiper of the potentiometer that determines the instantaneous speed of the flicker motor. After a random time delay, the main drive motor and the wiper of the potentiometer is reversed in direction and the test repeated.

*Brief description of the drawings*

The invention will be more fully understood, and other features and advantages thereof will become apparent, from the following detailed description of a preferred embodiment of the invention. The detailed description is to be considered in conjunction with the accompanying drawings, in which.

*Description of the preferred embodiments*

Figure 1:
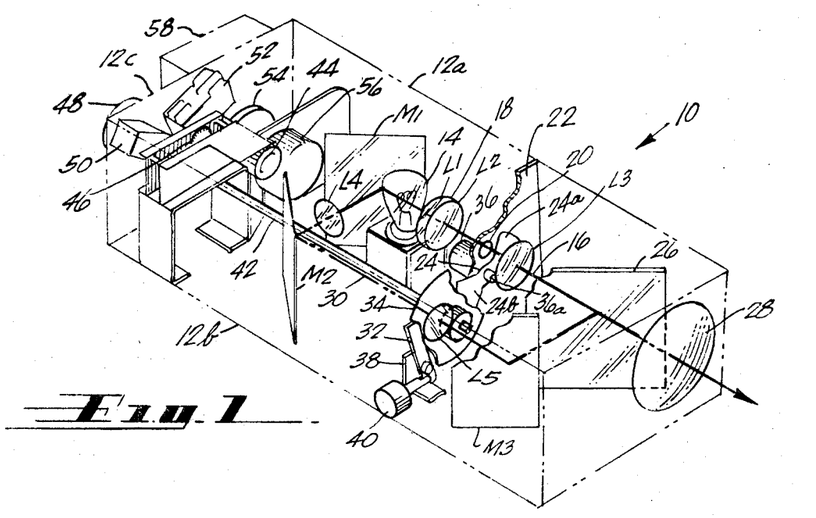
FIGURE 1 is a perspective view of a preferred embodiment of the visual parameter tester.

FIGURE 1 is a perspective view showing an exemplary structural arrangement of the visual parameter tester. The view has, of course, been somewhat simplified for clarity of illustration. Tester 10, in this embodiment, includes a generally rectangular container 12 to which are mounted the major tester components. A light source or lamp 14 is located about midway in the container 12 as shown. The light source can be, for example, a low voltage lamp with a compact filament.

Light from the lamp 14 proceeds in a background or primary beam 16 in a direct path through condenser 18 including lenses L1 and L2, then through aperture 20 in dividing wall 22 pass flicker or primary shutter 24 and through lens L3 and (50—50) beam splitter 26 to illuminate uniformly the whole test field of viewing screen 28. A spotlight secondary beam 30 follows an indirect path by way of mirror M1, lens L4, mirror M2, pass secondary shutter 32 through a variable light attenuator or optical wedge 34, through lens L5 against mirror M3 and beam splitter 26 to become coincident with the primary beam 16 and illuminate a central, circular area of the test field. The viewing screen 28 diameter is 1½ inches and the center spot diameter is ¾ inch, for example.

The mirrors M1, M2 and M3, and the beam splitter 26 are all set at an angle of, for example, 45 degrees to the side walls 12a and 12b of the container 12. The lenses L1 through L5 can have the following illustrative specifications:

| Lens | Diopters | Diameter | Focal length | F number |
| --- | --- | --- | --- | --- |
| L1 | 80 | 15/16 in.=130 mm | 1.25 in.=3.2 cm | 0.95 |
| L2 | 80 | 15/16 in.=130 mm | 1.25 in.=3.2 cm | 0.95 |
| L3 | 13 | ⅞ in.=22 mm | 3 in.=7.7 cm | 3.3 |
| L4 | 16 | 1 in.=25 mm | 2.46 in.=6 cm | 3.28 |
| L5 | 9 | ¾ in.=18 mm | 4.38 in.=11.1 cm | 4.38 |

The flicker shutter 24 is centrally mounted on the drive shaft 36a of flicker motor 36. The flicker shutter 24 has two sectors 24a and 24b located on opposite sides of the axis of shaft 36a on the same diameter. When the flicker shutter 24 is rotated by its drive motor 36, the primary beam 16 is "chopped" by the shutter 24 to provide 100 percent, square wave modulation of the beam 16. The flicker shutter 24 is also used to obscure the aperture 20 and, hence, block the primary beam 16 when desired.

Secondary shutter 32 can be, for example, a flag-type shutter which is pivotally mounted to container bracket 38 and has its lower end connected to solenoid 40. When the solenoid 40 is energized, the shutter 32 is moved into position to block the secondary beam 30. The shutter 32 is located just before the circular optical wedge 34 which is positioned at or near the focus of the lens L4, and the lens L5 is positioned after the optical wedge 34 close to it.

The optical wedge 34 is mounted to a rotatable main shaft 42 which is driven by main drive motor 44 through reduction gearing 46. Shaft angle encoder 48 is suitably coupled to the shaft 42 and provides a digital output signal giving the position of the shaft 42. Since the circular optical wedge 34 is affixed to the shaft 42, the readout from the encoder 48 provides a reading or measurement of the brightness of the secondary beam 30 transmitted to the viewing screen 28. The instantaneous readings from the encoder 48 is recorded on a digital printer (not shown in FIGURE 1).

Limit switches 50 and 52 are mounted to the end wall 12c of the container 12 to limit the angular rotation of the main shaft 42. The main drive motor 44 is reversed in direction whenever either of the limit switches 50 and 52 is reached and actuated by appropriate cam means (not shown) connected to the shaft 42. Also connected to the shaft 42 is a drive wheel (not visible in FIGURE 1) which frictionally engages another wheel 54 mounted to the wiper shaft of flicker potentiometer 56. The wiper of the potentiometer 56 is thus rotated with the rotational movement of the shaft 42. The output of the potentiometer 56 controls the speed of the flicker motor 36 which drives the flicker shutter 24. Printed circuit boards mounted within housing 58 provide the control circuitry for the visual parameter tester 10.

Figure 2:
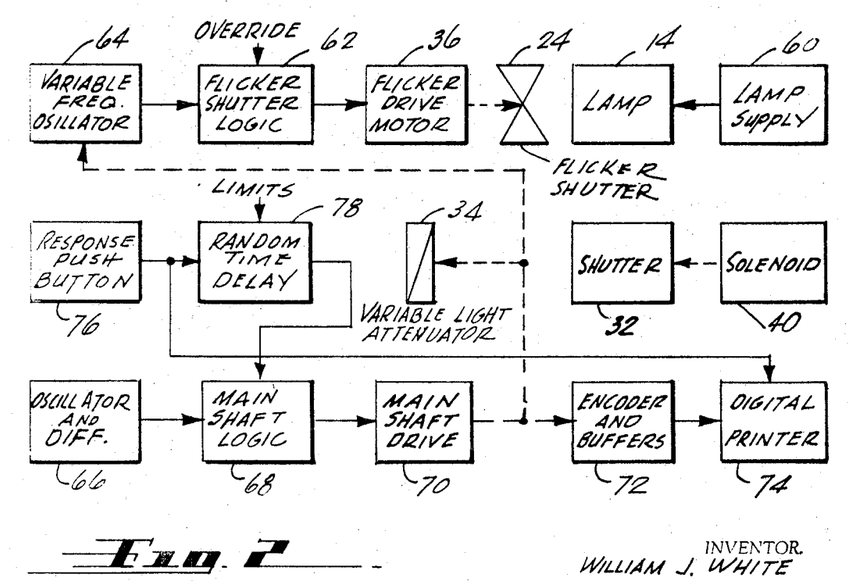
FIGURE 2 is a block diagram of the invention.

FIGURE 2 is a schematic block diagram of the visual parameter tester 10. As mentioned previously, the tester 10 is used to test and measure certain parameters of human vision including differential brightness sensitivity, absolute brightness sensitivity and critical fusion frequency, among other. In measuring differential brightness sensitivity, the subject is required to detect and press a push button on the appearance and disappearance of the central luminous area as it changes in brightness relative to the rest of the larger 1½ inch circular background field of the screen 28. Both the primary and secondary beams 16 and 30 are used in this test. The primary beam 16 provides the background luminosity which can be set at, for example, 0.03, 0.3, 3.0 or 30 foot-lamberts. This can be accomplished by either varying the brightness of the lamp 14 or interposing a neutral density filter of appropriate density in the primary beam 16. The secondary beam 30 illuminates the central screen area whose brightness is caused to fluctuate cyclically by rotation of the optical wedge 34 mounted on the rotatable shaft 42.

In measuring absolute brightness sensitivity, only the secondary beam 30 is used in this test. The primary beam 16 is occulted by the flicker shutter 24 which is set in a position to close the aperture 20. The luminosity of the ¾ inch diameter central area on scren 28 is automatically varied in the vicinity of the absolute sensitivity threshold of the subject who responds by pressing the push button when the central test area appears and disappears. No fixation light is provided in this test, although one could be provided if desired.

In measuring critical fusion frequency, the secondary beam 30 is occulted during this test by energization of the solenoid 40 which actuates the shutter 32 and blocks the beam 30. The flicker motor 36 drives the flicker shutter 24 during this test to interrupt the primary beam 16, providing 100 percent, square wave modulation at a frequency which is continuously variable between 10 and 75 c.p.s., for example. The subject responds by pressing the push button when flicker becomes apparent with decreasing frequency and when it disappears with increasing frequency. The steady screen luminosity can be set to different selected values.

Visual acuity can be measured by the tester 10 with the addition of a dual Ronchi grating device (not shown) which can be operatively positioned over the screen 28. When this is done, the rotation of one grating relative to the other is produced by a roller (also not shown) mounted eccentrically on the rotatable shaft 42, co-acting with an arm attached to the moving grating. This rotation changes the number of parallel lines crossing the field from nearly 0 to 240 lines/inch. The distance between lines subtends a visual angle down to ½ minute of arc at a test distance of 28 inches (equivalent to Snellen targets for 20/10 acuity). The subject responds by pressing the push button when the lines become visible and when they disappear. The angular position of the shaft 42 and therefore the encoder 48 output is, of course, related to the angle between the two Ronchi gratings and, accordingly, the separation between lines. Background luminosity can be set to different selected values.

In FIGURE 2, lamp supply 60 supplies power to lamp 14. The lamp supply 60 can be adjustable to vary the voltage provided to the lamp 14 in order to control its brightness. Alternatively, a neutral density wheel filter (not shown) can be positioned before the flicker shutter 24 in the primary beam 16 to control the background luminosity of the screen 28. Flicker motor 36 drives the flicker shutter 24 and is controlled by the output from flicker shutter logic circuitry 62 having the output from a variable frequency oscillator 64 applied thereto. Override signals can be applied to the logic circuitry 62 to cause the flicker shutter 24 to be fixedly positioned in orientations which close the aperture 20 or leave it fully open.

The output from free-running oscillator and differentiator means 66 is applied to main shaft logic circuitry 68 which has its output connected to energize main shaft drive means 70. The drive means 70 includes the main drive motor 44 and gearing 46, which drive the wiper of potentiometer 56 (FIGURE 1). The drive means 70 also drives the variable light attenuator or optical wedge 34 and the shaft angle encoder 48. Variation of the potentiometer 56 varies the frequency of the variable frequency oscillator 64. Encoder and buffer means 72 has its output connected to digital printer 74 as indicated in FIGURE 2. A recording is made by printer 74 whenever push-button switch 76 is actuated. The printer 74 is, for example, a Digital Printer Model 562A manufactured by Hewlett-Packard Company.

Response push-button switch 76 is also connected to random time delay circuitry 78 which provides a randomly delayed output to control the main shaft logic circuitry 68. The push-button switch 76 is preferably a momentary switch which provides an output signal when it is operated by the subject. The logic circuitry 68, of course, controls the main shaft drive means 70. Limits of rotation of the main shaft 42 are controlled by signals from limit switches 50 and 52 applied to the random time delay circuit 78. Shutter 32 is positioned before the optical wedge 34 and is operated by solenoid 40. The lamp supply 60, the solenoid 40 and the flicker shutter logic circuitry 62 override control can be manually controlled as required in the tester 10 which is illustrated in FIGURES 1 and 2. Of course, a suitably programmed computer can be used to perform such functions, including the recording of test data and results.

Figure 3A:
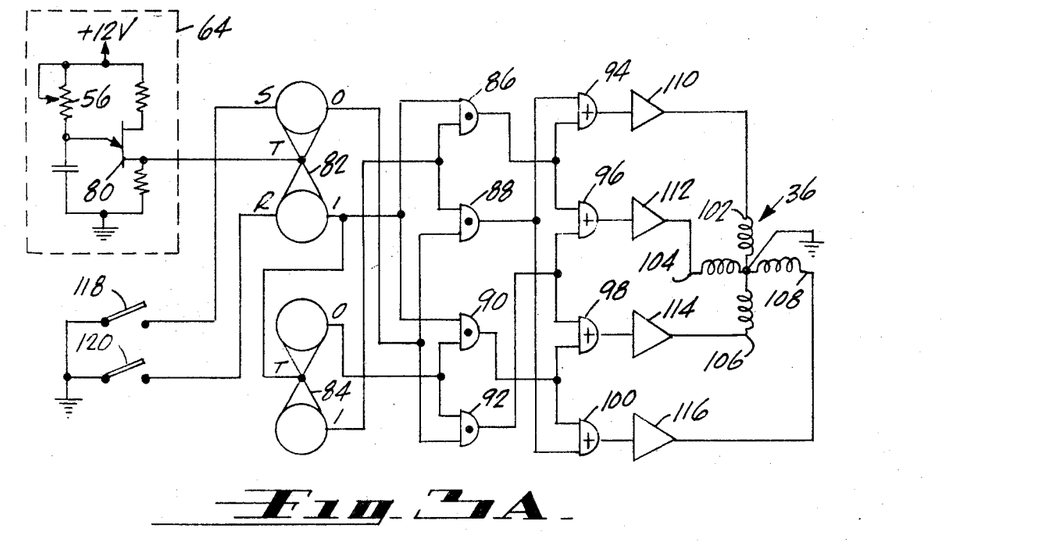
FIGURES 3A, 3B, 3C and 3D are circuit diagrams of various electrical components of the invention.
Figure 3B:
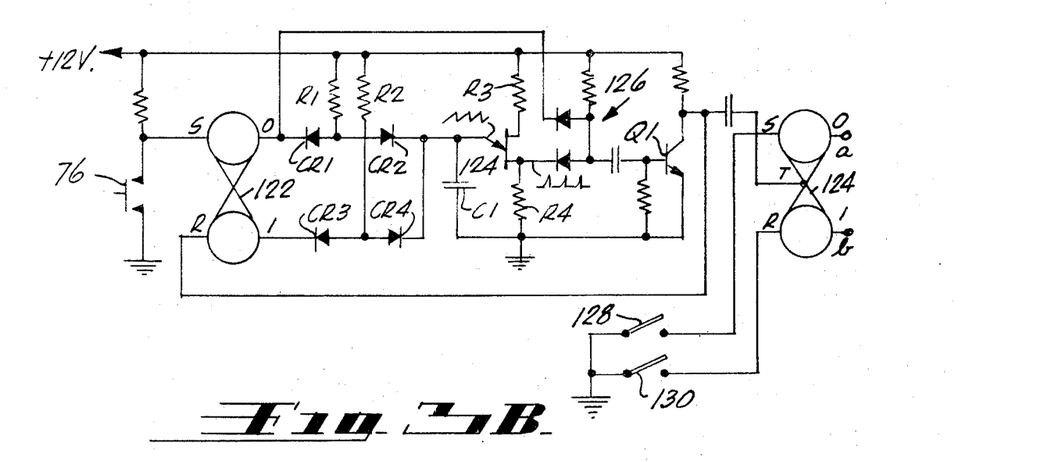
Figure 3C:
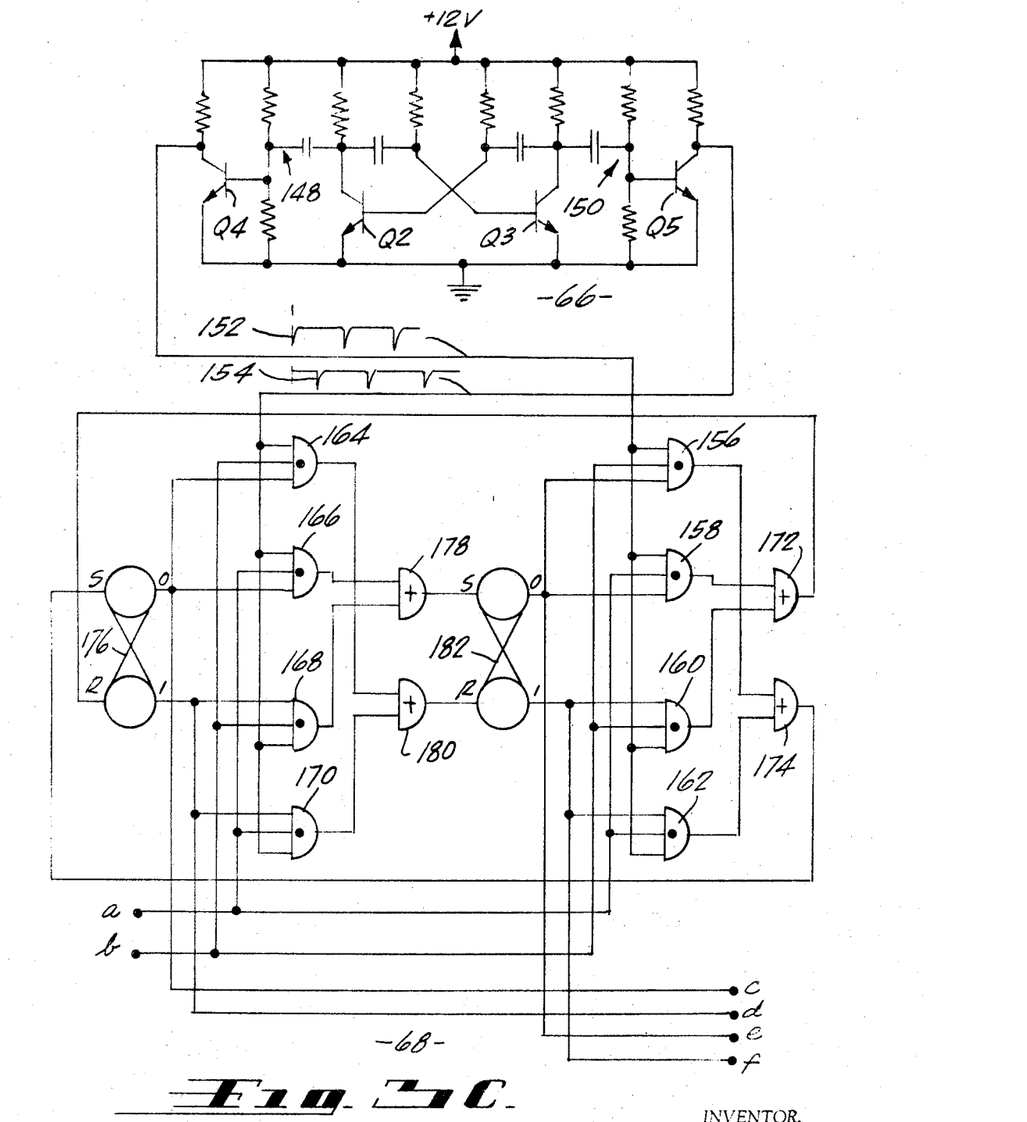
Figure 3D:
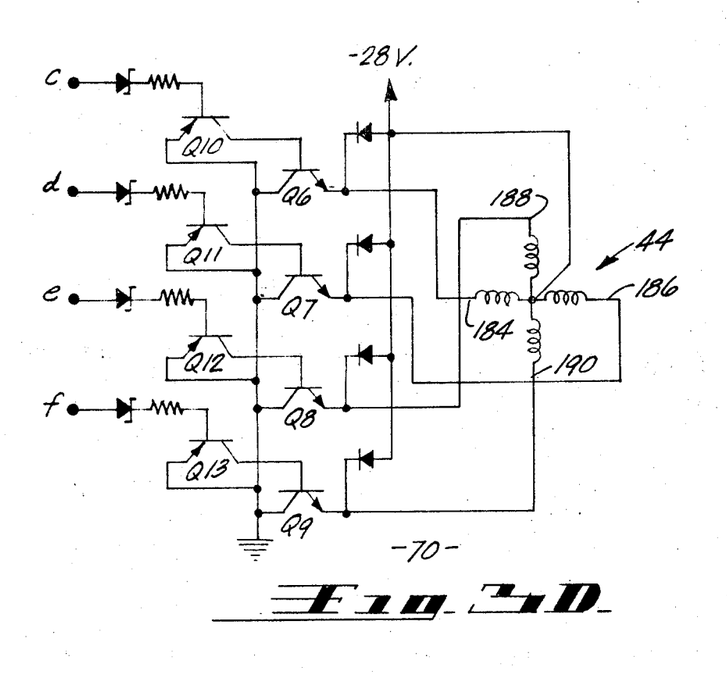

FIGURES 3A, 3B, 3C and 3D show circuit diagrams of the main portions of the block diagram shown in FIGURE 2. FIGURE 3A shows an illustrative circuit diagram of the variable frequency oscillator 64, the flicker shutter logic circuitry 62 and the flicker shutter drive motor 36. The circuit diagram of FIGURE 3B is an example of that for the response push-button switch 76 and the random time delay circuit 78. Similarly, a circuit diagram of the oscillator and differentiator means 66 and main shaft logic circuitry 68 is shown in FIGURE 3C. An exemplary circuit diagram of the main shaft drive means 70 is shown in FIGURE 3D.

In FIGURE 3A, unijunction transistor 80 is connected in a substantially conventional oscillator circuit including flicker potentiometer 56 which has its wiper driven by wheel 54 (FIGURE 1) that is, of course, indirectly coupled to the movement of the main shaft 42. Variation of the potentiometer 56 will vary the output pulse frequency of the oscillator 64. The pulse output from the oscillator 64 is applied to the differentiating toggle input "T" of flip-flop 82 to trigger the same with each pulse applied thereto. The "1" output of the flip-flop 82 is connected to the toggle input "T" of another flip-flop 84. It can be seen that the flip-flops 82 and 84 are connected together as a two-stage binary counter wherein the flip-flop 82 is triggered for each input pulse thereto and the flip-flop 84 is triggered for every other input pulse to the first counter stage.

The outputs of the flip-flops 82 and 84 are connected to "and" gates 86, 88, 90 and 92 as shown in FIGURE 3A. This connection is such that for a series of input pulses to the flip-flop 82, the "and" gates 86, 88, 90 and 92 produce a corresponding series of output pulses in sequence cyclically from these gates. For example, for the condition indicated in FIGURE 3A, the "and" gate 86 produces an output pulse therefrom. On the next input pulse to flip-flop 82, both of the flip-flops 82 and 84 will change states. When this occurs, the "and" gate 92 will produce an output pulse therefrom. The next input pulse causes the flip-flop 82 only to change its state and, thus, the "and" gate 90 will have an output pulse therefrom.

The "and" gates 86, 88, 90 and 92 are connected to "or" gates 94, 96, 98 and 100 in the manner shown in FIGURE 3A. The outputs of the "or" gates 94, 96, 98 and 100 are connected to respective coil ends 102, 104, 106 and 108 of the flicker shutter drive motor 36 through amplifiers 110, 112, 114 and 116. Accordingly, output pulses are obtained, in the example described above, from "or" gates 94 and 96, then "or" gates 96 and 98, and then "or" gates 98 and 100, following the sequence given. The coil ends 102 and 104, then ends 104 and 106, and then ends 106 and 108 are thus energized by the amplified output pulses from the noted "or" gates. It can be seen that pairs of adjacent coil ends of the motor 36 are successively energized counterclockwise in a cyclic manner. The motor 36 in this instance is a stepper motor which responds by driving the flicker shutter 24 at a speed that is proportional to the output frequency of the oscillator 64. The motor 36 can be, for example, a Step Servomotor No. 008–845 manufactured by IMC Magnetic Corporation.

The flicker shutter 24 can be set at positions in which it obscures or does not obscure the aperture 20 (FIGURE 1). In order to set the shutter 24 in a selected one of these positions, either switch 118 or 120 is closed. The switch 118 connects the set input "S" of the flip-flop 82 to ground when closed, and the switch 120 connects the reset input "R" of the flip-flop 82 to ground when closed. These switches 118 and 120 can thus be used to control the state of the flip-flop 82 which then establishes the particular coil energization of the motor 36 to align shutter 24 along diameters intersecting at right angles. The switch 118 can be used to place the flicker shutter 24 along a diameter wherein the aperture 20 is obscured, and switch 120 can be used to place the shutter 24 along a diameter at 90 degrees to the aforementioned diameter so that aperture 20 is unobscured, for example.

In FIGURE 3B, the response push-button switch 76 is connected to the set input "S" of flip-flop 122. Resistor R1 connects +12 volts to the "0" output of the flip-flop 122 through diode CR1 and to the emitter of unijunction transistor 124, connected in an oscillator circuit, through diode CR2. Resistor R2 connects +12 volts to the "1" output of the flip-flop 122 through diode CR3 and to the emitter of the unijunction transistor 124 through diode CR4. The resistor R1 has a resistance of 510 kilohms and resistor R2 has a resistance of 11 kilohms, for example. The emitter of the unijunction transistor 124 is connected to ground through capacitor C1, its first base is connected to +12 volts through resistor R3 and its second base is connected to ground through resistor R4.

The "0" output of the flip-flop 122 is connected to a first input of "and" circuit 126 and the second base of the unijunction transistor 124 is connected to the second input of the "and" circuit 126. The output of the "and" circuit 126 is connected to the base input of the amplifier including transistor Q1. The collector output of the transistor Q1 is connected to the toggle input "T" of flip-flop 126, and also back to the reset input "R" of the flip-flop 122. The set input of the flip-flop 126 can be connected to ground through switch 128 and the reset input can be connected to ground through switch 130.

For the state of the flip-flop 122 indicated in FIGURE 3B, the capacitor C1 is charged through resistor R2 and diode CR4 until it reaches a sufficiently high voltage to fire the unijunction transistor 124 and discharge through the resistor R4. This is repeated to produce a sequence or series of output pulses to the second input of the "and" circuit 126. No output signal is obtained from the "and" circuit 126, however, since its first input is connected to the "0" output of the flip-flop 122 in its indicated state. The frequency of the series of output pulses from the second base of the unijunction transistor 124 being applied to the second input of the "and" circuit 126 is, of course, dependent upon the value of the resistor R2.

When the subject presses the push-button switch 76 at any instant, the flip-flop 122 changes state such that diode CR1 stops conducting and the diode CR3 then conducts. A high (positive) voltage is provided to the first input of the "and" circuit 126 and the charging rate of the capacitor C1 will then be changed to that dependent upon the value of the resistor R1. The capacitor C1 at that instant may be charged to any particular random voltage. Since its charging rate is then altered, the capacitor C1 will not reach the potential required to fire the unijunction transistor 124 at the same frequency rate as before. A random time delay is thus instigated in the output from the second base of the unijunction transistor 124.

When an output signal does appear from the second base of the unijunction transistor 124 to the second input of the "and" circuit 126, an output signal will be produced from the "and" circuit 126 since its first input then has a high (positive) voltage provided thereto. The output signal from the "and" circuit 126 causes the transistor Q1 to conduct and put out a signal which is applied to the toggle input of the flip-flop 126 to alter its state. At the same time, the output signal from the transistor Q1 is fed back to the reset input of the flip-flop 122 to return it to the state indicated in FIGURE 3B. This, of course, causes the capacitor C1 to return to the original charging rate determined by the value of the resistor R2.

The output of the flip-flop 126 is used to control the direction of rotation of the main drive motor 44 which drives the variable light attenuator 34, the shaft angle encoder 48 and the wiper of the potentiometer 56 which indirectly controls the speed of the flicker shutter 24 (FIGURES 1 and 2). Thus, after a random delay time from the instant that the subject had pressed the push-button switch 76, the state of the flip-flop 126 is eventually changed to reverse the direction of the variation of the parameter being tested. The direction of rotation of the attenuator 34 is changed when measuring differential brightness sensitivity, and the speed of the flicker shutter 24 is reversed (increasing speed changed to decreasing and vice versa) when measuring critical fusion frequency sensitivity.

Figure 4:
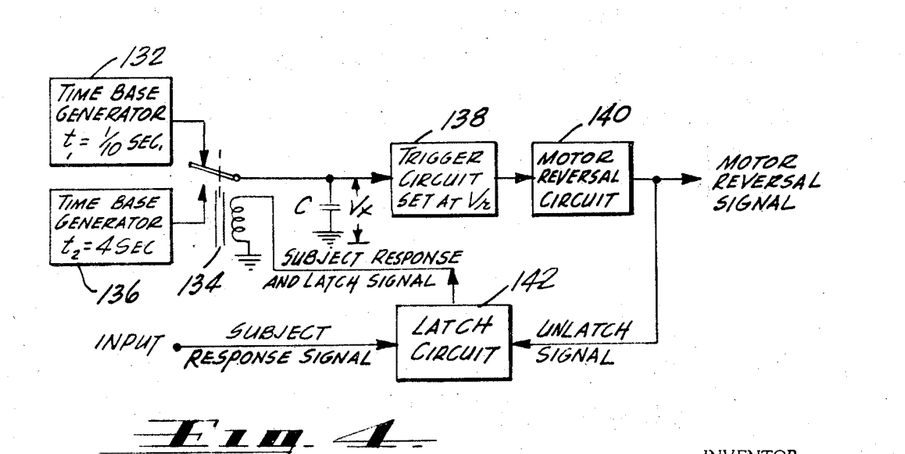
FIGURE 4 is a block diagram of a form of the random time delay circuit used in this invention.

FIGURE 4 is a functional block diagram of the randomtime delay circuit used in this invention. A ramp or time base generator 132 is normally connected through the pole of relay 134 to charge capacitor C. The period of the generator 132 is, for example, $\frac{1}{10}$ second, and the relay 134 obviously can represent any electronic or electromechanical switching means. When the relay 134 is energized, another ramp or time base generator 136 is connected through the relay pole to the capacitor C. The period of the generator 136 is, for example, 4 seconds. Alternatively, energization of the relay 134 can be arranged to alter the charging rate of the generator 132. This, is of course, equivalent to having two generators.

The capacitor C is connected to trigger circuit 138 which is set to respond at an input voltage $V_r$ and produce an output signal to operate motor reversal circuit 140. Operation of the circuit 140 produces a motor reversal signal and an unlatch signal which is applied to latch circuit 142. Accordingly, the capacitor C may be charged by the generator 132 to a random voltage $V_x$ when a subject response signal is applied to latch circuit 142 to actuate the relay 134 and connect the generator 136 to continue charging the capacitor C at, however, a slower rate. After a random time delay which depends upon the instantaneous value of the random voltage $V_x$, the capacitor C voltage finally reaches the trigger circuit 138 response voltage $V_r$. This produces an output signal from trigger circuit 138 and causes the motor reversal circuit 140 to produce the motor reversal signal and the unlatch signal which unlatches the relay 134 such that the capacitor C begins charging again at the charge rate of the generator 132.

Figure 5:
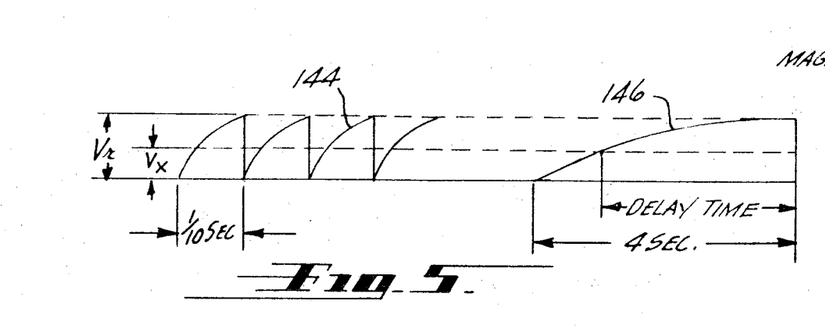
FIGURE 5 is a graph showing two waveforms which are used to explain the operation of the random time delay circuit.

FIGURE 5 is a graph which shows waveform 144 having a period of $\frac{1}{10}$ second, and waveform 146 having a period of 4 seconds. At any random voltage $V_x$ produced by waveform 144 on the capacitor C, the change in charging rate from that of waveform 144 to 146 produces a random delay time interval, as indicated on the waveform 146, which is required before the capacitor C reaches the trigger voltage $V_r$ needed to reverse the main drive motor 44. It can be seen that the indicated delay time interval is clearly dependent upon the instantaneous value of the random voltage $V_x$.

Referring now to FIGURE 3C, transistors Q2 and Q3 are shown connected in an astable multivibrator circuit having differentiating networks 148 and 150 respectively connecting outputs of the multivibrator circuit to transistors Q4 and Q5. The outputs from the transistors Q4 and Q5 include two series of pulses 152 and 154 as indicated in FIGURE 3C. The pulses 152 are applied to a first input of "and" gates 156, 158, 160 and 162, and the pulses 154 are applied to a first input of "and" gates 164, 166, 168 and 170. The second inputs of the "and" gates 156 through 162 are connected to lead $a$ which is connected to the "0" output of the flip-flop 126 shown in FIGURE 3B. Similarly, the second inputs of the "and" gates 164 through 170 are connected to lead $b$ which is connected to the "1" output of the flip-flop 126.

The outputs of the "and" gates 156 through 162 are connected as shown in FIGURE 3C to "or" gates 172 and 174, and the outputs of the "or" gates 172 and 174 are connected respectively to the reset and set inputs of flip-flop 176. The outputs of the flip-flop 176 are connected to the third inputs of the "and" gates 164 through 170 in the manner shown in FIGURE 3C. The outputs of the "and" gates 164 through 170 are connected to "or" gates 178 and 180 as shown, and the outputs of the "or" gates 178 and 180 are connected respectively to the set and reset inputs of flip-flop 182. The outputs of the flip-flop 182 are connected in the manner indicated to the third inputs of the "and" gates 156 through 162. The "0" and "1" outputs of flip-flop 176 are also connected to leads c and d, and the "0" and "1" outputs of flip-flop 182 are also connected to leads e and f. These leads c, d, e and f connect with the main shaft drive means 70 indicated in FIGURE 2 and shown in detail in FIGURE 3D.

FIGURE 3D shows the drive means 70 including the main drive motor 44. Coil ends 184, 186, 188 and 190 of the motor 44 are connected to respective power transistors Q6, Q7, Q8 and Q9. These power transistors Q6, Q7, Q8 and Q9 are controlled by transistors Q10, Q11, Q12 and Q13, respectively, which have base inputs suitably connected to the leads c, d, e and f that are continued from FIGURE 3C. Whenever any of the transistors Q10 through Q13 are "on," the corresponding power transistors Q6 through Q9 conduct current to their respective coil ends 184 through 190. The motor 44 is, in this instance, a stepper motor and its coil ends are energized in sequences established by the control circuitry shown in FIGURE 3C. It is noted that high (positive) signals applied to any of the bases of the transistors Q10 through Q13 causes the corresponding power transistors Q6 through Q9 to stop conduction therethrough.

The flip-flop used in this invention can, for example, be those such as Flip-Flop Part No. FF 1514G manufactured by Intellux, Inc. The "and" gates and the "or" gates shown in FIGURE 3C are, of course, responsive to low input signals and produce corresponding low output signals. When the $a$ lead is low in potential, the $b$ lead is high, as indicated for the outputs of the flip-flop 126 in FIGURE 3B. For the flip-flops 176 and 182 states indicated in FIGURE 3C, the "and" gate 158 has low inputs thereto by lead $a$ and the "0" output of the flip-flop 176. When the first pulse of the series 152 is applied to "and" gate 158, an output is provided to "or" gate 172 which, in turn, provides an output signal to the reset input of the flip-flop 176. This, however, does not affect the indicated state of the flip-flop 176. Thus, the outputs on leads c, d, e and f are respectively 0, 1, 0, 1.

The next timewise pulse is the first pulse of the series 154 which produces only an output from "and" gate 166 for the conditions indicated. The "or" gate 178 produces an output signal in response to the output from the "and" gate 166 and is applied to the set input of flip-flop 182 to trigger the same. The output on leads c, d, e and f then becomes 0, 1, 1, 0, respectively. The second pulse of the series 152 next produces an output from "and" gate 162 which, in turn, produces an output from "or" gate 174 to trigger the flip-flop 176. The outputs on leads c, d, e and f are now 1, 0, 1, 0. The next outputs on leads c, d, e and f are 1, 0, 0, 1 and so forth.

For the output sequence given above for the leads c, d, e and f, adjacent pairs of coil ends of motor 44 are successively energized in a counterclockwise direction. If the flip-flop 126 (FIGURE 3B) was triggered such that lead $b$ was low in potential, the leads c, d, e and f would have the sequence 1, 0, 0, 1; 1, 0, 1, 0; 0, 1, 1, 0; and 0, 1, 0, 1 instead of that previously noted. This sequence would cause the adjacent pairs of coil ends of motor 44 to be successively energized in a clockwise direction. Thus, it is evident that the flip-flop 126 governs the direction of rotation of the main drive motor 44 which is used on all of the different tests and seldom has to have its power turned off.

Figure 6:
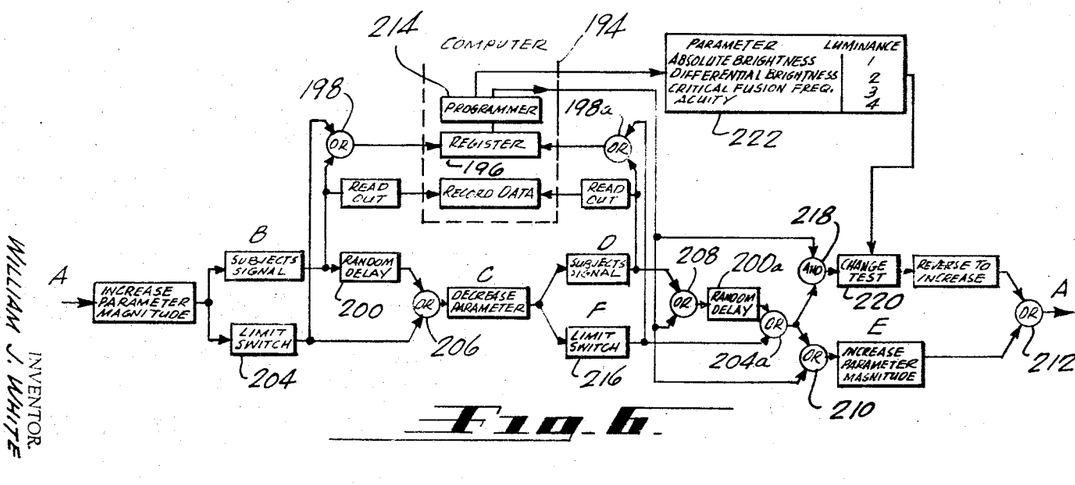
FIGURE 6 is a functional diagram illustrating the sequence of operation of a visual parameter tester wherein a computer is utilized to record test data and program the various test steps.

FIGURE 6 is a flow diagram which depicts the sequence of operations of the invention including a computer connected to record test data and program the various tests and conditions thereof. The computer stores and processes the response data which is read out each time that the subject presses the response push button, and controls the test sequence according to a predetermined program. The program prescribes the tests to be performed, the background brightness (where applicable) and the number of test cycles. When the programmed number of test cycles has been completed for any particular test, the computer automatically causes the visual parameter tester unit to change to the conditions programmed for the next test.

Figure 7:
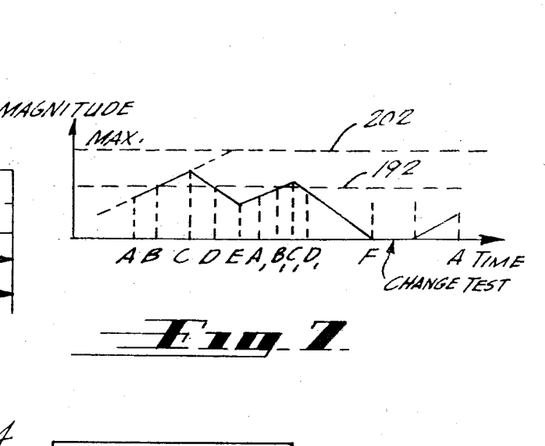
FIGURE 7 is a graph showing a plot of parameter magnitude versus time to illustrate the variation in parameter magnitude occurring during the sequence of operation indicated in FIGURE 6.

FIGURE 7 is a graph illustrating the variation in magnitude of a test parameter as the tests are being conducted. The capital letters indicated in the flow diagram of FIGURE 6 correspond with similar letters shown in the graph of FIGURE 7. Referring jointly to FIGURES 6 and 7, point A represents an instant when the magnitude of a parameter is increasing during a test. As the magnitude increases, it passes through the critical match level 192 at point B on FIGURE 7. The subject, detecting the match, presses the response push button 76 at point B in FIGURES 6. This causes a readout of the main shaft 42 position into computer 194 by recording the encoder 48 output therein, the event is registered in register 196 through "or" gate 198, and the random delay function 200 (such as delay circuit 78) is actuated to allow the parameter magnitude to continue to increase until point C when the direction of change is reversed.

In the event that the subject makes no response at or following point A, the parameter will continue to increase in magnitude until the limit or maximum level 202 is reached. Limit switch 204, corresponding to one of the directional flip-flop 126 limit switches (128 or 130), is actuated to cause instantaneous reversal of the parameter direction through "or" gate 206, bypassing the random delay function 200. To preserve the test sequence, however, the event is registered in register 196 through "or" gate 198 but no information is read out and recorded other than that a reading has been omitted.

In the normal course of events, the subject presses the push button 76 at point B and the parameter continues to increase in magnitude until point C when the direction of change is reversed. When the parameter magnitude reaches match point D, the subject would normally press the push button 76 again. The main shaft 42 position is then read out again and recorded in the computer 194. The event is recorded in the register 196 through "or" gate 198a, and random delay function 200a is initiated through "or" gate 208. Assuming that a change in test is not programmed for this stage, the decrease in parameter magnitude continues until, through "or" gates 204a and 210, reversal in direction of the parameter magnitude occurs at point E. The sequence then returns to point A (which is now distinguished by a subscript as point $A_1$ in FIGURE 7) through "or" gate 212, and the same operations as before are repeated at times $A_1$, $B_1$, $C_1$ and $D_1$ as illustrated in FIGURE 7.

At point $D_1$ this time, it is assumed that a change in test is programmed. The programmer 214 produces a signal which inhibits the path through the "or" gate 208 so that the parameter continues to decrease in magnitude until the lower limit is reached at point F, as established by limit switch 216. The "or" gate 210 is inhibited and the operational path is through "or" gate 204a and "and" gate 218 to activate means 220 which causes an appropriate change in the parameter tester elements required for the next test before restarting the cycle at point A with the parameter magnitude varying in the proper direction. The various tests and test conditions are generally indicated in block 222 and can be selectively programmed by the programmer 214.

It should be apparent from the foregoing that the visual parameter tester including a conventional computer eliminates a number of manual steps and adjustments while the tests are conducted. The basic invention may be obviously modified in various ways without altering the principles involved in this invention.

What is claimed is:
1. A visual parameter tester comprising:
a light source;

optical elements arranged to form a primary and a secondary light beam;

a screen, said primary beam normally illuminating a first part thereof and said secondary beam normally illuminating a second part thereof;

a movable element which is movable in one direction and in a reversed direction;

variable light attenuator means for varying the illumination of the second part of said screen by said secondary beam, said attenuator means being variable in accordance with the movement of said movable element;

means responsive to the movement of said movable element for providing an indication representative of the instantaneous position of said movable element;

random time delay means connected to control the direction of movement of said movable element; and response means for actuation by a subject under test, said response means upon actuation thereof causing an instantaneous readout of the representative indication of said indication providing means and causing activation of said delay means to provide a random time delay before causing reversal in movement direction of said movable element.

2. A visual parameter tester as defined in claim 1 including a primary shutter positioned in said primary beam and selectively adjustable to positions for respectively blocking and passing said primary beam which normally illuminates the first part of said screen.

3. The visual parameter tester as defined in claim 1 including a secondary shutter positioned in said secondary beam and selectively adjustable to positions for respectively blocking and passing said secondary beam which normally illuminates the second part of said screen.

4. The visual parameter tester as defined in claim 1 wherein the part of said screen normally illuminated by said secondary beam is a portion of the part of said screen normally illuminated by said primary beam.

5. The visual parameter tester as defined in claim 1 wherein said movable element is a rotatable shaft, said attenuator means includes a circular optical wedge which is mounted on said shaft, and said indication providing means includes a shaft angle encoder adapted to be driven by said shaft to provide an output which is representative of the instantaneous angle of said shaft.

6. The visual parameter tester as defined in claim 2 including computer means for recording the indications of said indication providing means and controlling the selective adjustment of said primary shutter.

7. The visual parameter tester as defined in claim 2 including means for driving said primary shutter at a variable speed, said indication providing means being adapted to provide an indication which is representative of the instantaneous speed of said primary shutter.

8. The visual parameter tester as defined in claim 5 including a primary shutter positioned in said primary beam and selectively adjustable to positions for respectively blocking and passing said primary beam which normally illuminates the first part of said screen.

9. The visual parameter tester as defined in claim 8 including a secondary shutter positioned in said secondary beam and selectively adjustable to positions for respectively blocking and passing said secondary beam which normally illuminates the second part of said screen.

10. The visual parameter tester as defined in claim 9 wherein said secondary shutter is adjusted to block said secondary beam, and including means for driving said primary shutter at a speed which is variable in accordance with the rotation of said rotatable shaft whereby said shaft angle encoder provides an output which is representative of the instantaneous speed of said primary shutter.

References Cited

UNITED STATES PATENTS

| | | | |
|---|---|---|---|
| 2,209,728 | 7/1940 | Higley | 351—28 |
| 2,495,708 | 1/1950 | Draeger et al. | 351—17 X |

DAVID SCHONBERG, *Primary Examiner.*

P. A. SACHER, *Assistant Examiner.*

U.S. Cl. X.R.

351—1, 30, 31, 32, 36, 37

PO-1050
(5/69)

UNITED STATES PATENT OFFICE
CERTIFICATE OF CORRECTION

Patent No. 3,424,519      Dated January 28, 1969

Inventor(s) William J. White

It is certified that error appears in the above-identified patent and that said Letters Patent are hereby corrected as shown below:

In the drawings, Sheet 2, Fig. 3B, the right flip-flop reference numeral "124" should read --126'--. Column 2, line 62, the word "fussion" should read --fusion--. Column 3, line 8, the word "poteniom-" should read --potentiom--. Column 4, line 49, the word "other" should read --others--; and line 68, the word "scren" should read --screen--. Column 7, lines 24, 25, 61, 67 and 74, column 8, lines 61 and 64, column 9, lines 34, 58 and 64 and column 10, line 28, the flip-flop reference numeral "126", each occurrence, should read --126'--. Column 8, line 8, the word "domtime" should read --dom time--; and line 19, the first comma "," should be located after "is". Column 9, line 27, the word "flip-flop" should read --flip-flops--. Column 10, line 17, the word "FIGURES" should read --FIGURE--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents